(12) United States Patent
Kohlem et al.

(10) Patent No.: US 7,651,131 B2
(45) Date of Patent: Jan. 26, 2010

(54) VEHICLE WITH A ROLLOVER-PROTECTION SYSTEM

(75) Inventors: Michael Kohlem, Osnabrück (DE); Wolfgang Kasubke, Georgsmariienhütte (DE)

(73) Assignee: Wilhelm Karmann GmbH, Osnabrueck ( * ) Notice: Subject to any disclaimer, the term of this patent is extended or adjusted under 35 U.S.C. 154(b) by 294 days.

(21) Appl. No.: 11/425,908

(22) Filed: Jun. 22, 2006

(65) Prior Publication Data

US 2006/0290126 A1    Dec. 28, 2006

(51) Int. Cl.
    *B60R 21/013* (2006.01)
(52) U.S. Cl. .................................................... 280/756
(58) Field of Classification Search .................. 280/756
    See application file for complete search history.

(56) References Cited

U.S. PATENT DOCUMENTS

| | | | | |
|---|---|---|---|---|
| 5,094,478 | A * | 3/1992 | Pfanzeder et al. | 280/756 |
| 5,236,219 | A * | 8/1993 | Jambor et al. | 280/756 |
| 5,626,361 | A * | 5/1997 | Heiner | 280/756 |
| 5,655,791 | A * | 8/1997 | Nowack et al. | 280/756 |
| 6,296,278 | B1 * | 10/2001 | Zupancic et al. | 280/756 |
| 6,334,366 | B1 * | 1/2002 | Schuler et al. | 74/2 |
| 6,352,285 | B1 * | 3/2002 | Schulte et al. | 280/756 |
| 6,817,628 | B2 * | 11/2004 | Hovelmann et al. | 280/756 |
| 6,902,190 | B2 * | 6/2005 | Nass | 280/756 |
| 7,121,625 | B2 * | 10/2006 | Malsch et al. | 297/410 |
| 7,198,294 | B2 * | 4/2007 | Welch | 280/756 |
| 7,311,330 | B2 * | 12/2007 | Kachouh | 280/756 |
| 2003/0205891 | A1 * | 11/2003 | Nass | 280/756 |

FOREIGN PATENT DOCUMENTS

| | | |
|---|---|---|
| DE | 195 40 819 | 5/1997 |
| DE | 197 12 955 | 10/1998 |
| DE | 198 38 989 | 11/1999 |

* cited by examiner

*Primary Examiner*—Paul N. Dickson
*Assistant Examiner*—Timothy Wilhelm
(74) *Attorney, Agent, or Firm*—Quinn Law Group, PLLC

(57) ABSTRACT

A vehicle with a rollover-protection system is provided, including at least one rollover-protection device arranged in the area of a transverse wall of the vehicle for at least one vehicle seat, with a first module arranged attached to the body with guide devices for a second module that can be moved in it between a lowered rest position and an elevated support position; with a releasable holding device to hold the second module in its rest position; with a locking device, by means of which the second module can be supported automatically in a position deviating from its rest position against a force acting in the direction of the rest position; and with a drive system with a spring-force accumulator, by means of which the second module is held in its rest position and can be moved, when necessary, in the direction of its support position.

21 Claims, 9 Drawing Sheets

VEHICLE WITH A ROLLOVER-PROTECTION SYSTEM

CROSS-REFERENCE TO RELATED APPLICATIONS

This application claims priority to German Patent Application No. DE 10 2005 029 451, filed on Jun. 24, 2005.

TECHNICAL FIELD

The invention relates to a vehicle, especially a convertible vehicle, with a rollover-protection system.

BACKGROUND OF THE INVENTION

In passenger cars or even in tractors, it is known to provide rollover-protection systems to create a survival space for occupants in the event of vehicle rollover, which have a rollover element, for example, a rollover bar, which is assigned to an individual vehicle seat or several vehicle seats, and in the rest position is housed in a cassette attached to the vehicle, from which it can be abruptly moved into an upper support position and locked in this support position on recognition of an accident of the vehicle.

Rollover bars typically consist of a U-shaped bar, whose tubular arms are vertically guided in the vertical tube of a module attached to the vehicle. A coil spring is arranged in the interior of each arm, which is held under tension by a holding device that can be released as a function of an accident signal of the vehicle sensor mechanism, so that the rollover bar is deployed in tenths of a second under the influence of a spring and locked into its support position by an appropriate locking device. The two tubular arms are then connected to each other by a cross-yoke, over which a cushioned impact element is generally pushed.

Examples of a rollover bar that can be deployed or swung out in the event of an accident, extending over the entire width of the vehicle, are described in DE 195 40 819 C2 and DE 197 12 955 A1.

DE 198 38 989 C1 is referred to as an example of a rollover-protection device assigned to only one vehicle seat, with a rollover element that can be deployed independently of a rollover element assigned to another vehicle seat. In it, a rollover-protection device assigned to each vehicle seat is disclosed, consisting of a cassette attached to the vehicle, a rollover element guided and secured and deployable in the cassette in the form of a profile-bar element extending over the entire width of the cassette, a locking device for self-locking of the deployment movement and a spring drive system to deploy the profile-bar element, and a mechanical holding device to hold the rollover element in a rest state against the tension force of a compression spring of a spring-drive system.

All the above-mentioned rollover-protection systems have the common feature that the module of the corresponding rollover protection device attached to the vehicle is configured as a robust cassette or a corresponding tube profile and is arranged in the area of a vehicle's transverse wall, positioned behind the driver's seat.

Depending on the configuration of the module attached to the vehicle, this is disadvantageously associated with a large number of components and high total weight for the rollover-protection system and therefore the entire vehicle.

The rollover-protection systems just described also have the drawback that passage capability between a storage space in the rear and the passenger compartment is often limited, because of the typically wide cassette of the module of the corresponding rollover-protection device attached required to the vehicle to guarantee the required rigidity.

Thus, rollover-protection devices arranged generally in the center of a vehicle seat permit no or only limited passage between an occupant space and a storage space in the rear of the vehicle, since only a limited area is available between the rollover-protection devices of the corresponding seats for a passage opening.

The task of the present invention is to modify a vehicle, especially a convertible vehicle, with a rollover-protection system of the type just mentioned with respect to the most compact possible design with few components that are easy to install, with limited weight, and also with improved passage capability.

SUMMARY OF THE INVENTION

A vehicle with a rollover-protection system is therefore provided that includes at least one rollover-protection device for at least one vehicle seat. The rollover-protection device is designed with a first module, attached to the body with guide devices for a second module that can be moved therewithin between a lowered rest position and an elevated support position, and has a releasable holding device to hold the second module in the rest position. In addition, a locking device is provided, by means of which the second module can be automatically supported in a position deviating from its rest position against a force acting in the direction of the rest position. A drive system with a spring-force accumulator is also provided, by means of which the second module is held in the rest position and, when necessary, can be moved in the direction of its support position.

The invention proposes that the deployable second module be designed with a cassette-like rollover element, a front wall of the rollover element being guided on a side of the transverse wall of the vehicle facing the occupant space, and a rear wall of the rollover element on a side of the transverse wall of the vehicle facing away from the occupant space.

With this kind of configuration of the rollover-protection system, the transverse wall of the vehicle, which can, for example, represent a rear wall arranged behind the rear seats, becomes an integral component of the corresponding rollover-protection device, since the transverse wall of the vehicle, in the region of a rollover-protection device, forms its first module attached to the vehicle.

In this way, the forces acting on the rollover-protection system and therefore transverse wall of the vehicle, in the event of a vehicle rollover, are optimally introduced into the support structure of the vehicle.

By superimposing, so to speak, the rollover element and the transverse wall of the vehicle in the area of the rollover-protection device, a simple and weight-saving design is obtained with few components, which, for the most part, can be produced from commercial semi-finished products. The assembly expense is also reduced accordingly.

The configuration of the vehicle according to the invention also permits a compact design, which is advantageous, if a passage opening, which can be made correspondingly large in a vehicle configuration according to the invention, is provided between a receiving space in the rear and the passenger compartment. In a particularly advantageous embodiment, the transverse wall of the vehicle can be made double-walled with a front wall and a rear wall, so that a cavity is produced between the walls of the transverse wall of the vehicle, in which functional components of the rollover-protection devices of the rollover-protection system can be arranged.

In addition, in an advantageous embodiment of the invention, a guide device with at least one guide rail for the corresponding wall of the rollover element can be arranged on the transverse wall of the vehicle, in which case the guide device can be designed, for example, in a simple design as a guide plate and therefore a separate component attached to the transverse wall of the vehicle.

The guide rails for the rollover element, can be formed on the guide plate by areas bent away from the transverse wall of the vehicle, so that an undercut or a spacing between the area of the guide plate forming a guide rail and the side of the transverse wall of the vehicle facing or facing away from the vehicle interior is produced. In this configuration, the rollover element appropriately has U-shaped areas, designed to engage beneath the guide rails, mounted on the transverse wall of the vehicle.

In other embodiments, additional guide devices, are also conceivable, for example, a center T-shaped guide part on the guide plate, to guide the rollover element on the transverse wall of the vehicle.

It is also advantageous, if the transverse wall of the vehicle has a cross-sectional tapering in the area of the rollover-protection device, so that the corresponding wall of the rollover element is arranged at least approximately flush with a surrounding area of the transverse wall of the vehicle, so that the rollover-protection device does not have an interfering effect.

To strengthen the transverse wall of the vehicle in the area of the rollover-protection device, a spacer component that spans an intermediate space between the front wall and the rear wall of the transverse wall of the vehicle can be arranged in a double-walled transverse wall of the vehicle.

This type of cuboid spacer component is suitable, because of its strength, to accommodate the spring-force accumulator of the drive system, which can be arranged, for example, in an axial hole running parallel to the deployment direction of the rollover element.

The rollover element, in a preferred embodiment of the invention, is designed in several parts, the front wall and the rear wall of the rollover element, each representing essentially a plate, which are connected to each other, at least on their upper ends.

This connection of the walls of the rollover element is preferably accomplished with an impact element, which can have an impact surface rounded-off in a semi-circular fashion on the top and can be designed to increase the rigidity with at least one cavity. In addition, it is advantageous, if a bridge connecting the walls of the rollover element is connected beneath the impact element.

In other variants, additional connection elements can also be provided between the walls of the rollover element, for example, in its lower area, for example, in the form of pins that can be guided in a corresponding slit-like recess of the transverse wall of the vehicle during movement of the rollover element.

In addition to a multi-part design of the rollover element with separate plates as walls, it is also conceivable to make the walls of the rollover element in one piece, with at least one connection element.

The walls of the rollover element, in addition to a plane, plate-like design, can also be designed with a profile, optionally with cavities.

The releasable holding device to hold the second module with the rollover element in its rest position can, in an advantageous variant, include a locking element mounted to pivot around a fixed axis of rotation, which has a detent section for effective connection to a locking element-mating part arranged on the rollover element in the rest position of the rollover element, the locking element being secured in the rest position by a blocking device of an actuator against a rotation that releases the holding device.

The locking element, in an advantageous embodiment, can be designed as a disk and, in addition to a detent section and a peripheral recess, into which the blocking element of the actuator engages in the rest position, it can have a peripheral stop, against which the blocking element, retracted from the recess by the actuator to transfer the second module into its support position, lies after rotation of the locking element that disengages the detent section from the locking element-mating part. The counterpart of the locking element can then be designed as a retaining tab on the bridge that connects the walls of the rollover element.

The configuration of the releasable holding device and the so equipped rollover-protection device enables reliable and cost-effect locking of the rollover element possible in its rest position, in which the holding device can advantageously be implemented with a few components that can be produced without high precision. The disk-like locking element is effective to replace the lever of a known double-lever system and can be mounted without a spring device opposite the blocking element of the actuator.

In a simple configuration, it can be conceived that the blocking element can be moved linearly in the axial direction by the actuator, so that a configuration of the actuator, for example, as an electromagnetic or piezoelectric actuator that retracts the blocking element in its axial direction to release the rollover element, is possible. The blocking element can then be a pin held in place by a spring against the locking element or a sheet element of simple design.

In an advantageous embodiment of the invention, the axis of rotation of the locking element is formed by a pin mounted on the side opposite a base element, in which the sides of the base element are connected to each other by a cross-arm that forms a seat for the actuator. The base element therefore represents a sort of cage for the releasable holding device, with which the holding device can be arranged on any components of the rollover-protection system attached to the body.

Another advantageous embodiment of the invention can also be provided, so that the pivotable locking element, which is engaged with a counterpart to the locking element of the second module in the rest position of the rollover element and, in the event of an accident, releases the rollover element for transfer into its support position, is secured in the rest position by a meltable insert of the actuator that can be melted in the event of an accident.

The use of a meltable insert, to secure the locking element and to enable release of the locking element in the event of an accident simply and cost-effectively guarantees reliable and rapid release of the rollover element. The meltable insert can have any shape, in principle, and be designed, for example, as a plate, bar, or wire.

In another advantageous embodiment of the invention, the locking element can be secured in the rest position in a stop position, from which it can be transferred to the support position in the event of an accident, by an actuator with a pyrotechnic propellant charge.

The locking device of the corresponding rollover-protection device can have at least a first ratchet device that can be brought into effective connection with a second ratchet device to support the second module and permit movement of the second module, starting from the rest position, in the direction of the support position. The first ratchet device preferably has a detent with at least one locking claw that cooperates with a lock element of the second ratchet device arranged on the second module and mounted axially floating or rotatable against the spring on the first module or the second module.

The second ratchet device can be designed with an extruded element with several honeycomb recesses arranged in the direction of movement of the second module, one behind the other, produced from an extruded profile and designed at least roughly as a strip, in which the detent engages, depending on a deployment position in the direction of its active position with its locking claw.

The lock element with the honeycomb recesses can be produced in a favorable manufacturing process from an extruded profile with channel-like recesses fixed by means of appropriately shaped cores, so that a disk-like area with predefined width is separated at a cutting angle, predefined with respect to a longitudinal axis of the recesses, i.e., obliquely, from the extruded profile, preferably by sawing.

A lock element produced in this way is simpler and more cost-effective to produce in comparison with a ratchet strip designed with a toothed profile.

In addition, the rollover-protection system is then adaptable, in the area of the locking device, to different loads simply by changing the dimensioning of the individual components of the locking device, which, in ordinary rollover-protection systems, can only be implemented with much higher expense, because of the more complex design.

Consequently, there is a possibility of designing the strip-like lock element of the second ratchet device with several rows of recesses arranged adjacent to each other, in which several locking claws of the detent, also arranged next to each other and beneath each other, engage simultaneously in several recesses of the lock element, so that in the area of the locking device, higher forces acting on the rollover-protection system are supportable during an accident of the vehicle.

Overall, the proposed locking device represents a simple and cost-effective design, since little or no precision components are required and therefore significantly simplified manufacturing processes can be used.

The vehicle according to the present invention preferably has a rollover-protection device for each vehicle seat, which is driven independently from the rollover-protection device of another seat, so that tilting of the deployable module during its deployment movement, and therefore an adverse effect on functional reliability or possibly additional required synchronization devices can be avoided.

To achieve the largest possible pass-through opening, it is advantageous if the rollover-protection devices of two vehicle seats of one seat row are arranged in the opposite direction, essentially off-center relative to the corresponding vehicle seat, which means that their components are arranged mostly in the area of a side of the corresponding vehicle seat facing a vehicle seat.

In the context of the present invention, the transverse wall of the vehicle can form both a wall formed on the body of the vehicle and a prefabricated element outside of the vehicle with the rollover-protection system, which can be attached to the vehicle structure. Attachment of this element to the vehicle structure can occur, for example, by screwing into mounts on the vehicle side.

In a modification of the invention, a restraint belt system with safety belt guides for at least one safety belt can also be integrated in the transverse wall of the vehicle or in the rollover-protection system. The components of a safety belt system, for example, a belt winder and an upper safety belt guide, can be integrated without problem via corresponding mounts in the transverse wall of the vehicle and in the components of the rollover-protection system.

The transverse wall of the vehicle and rollover-protection system can also include seat components like an upper and lower seatback support.

Further advantages and advantageous embodiments of a vehicle according to the invention can be seen in the description, the drawing, and the patent claims.

DETAILED DESCRIPTION OF THE PREFERRED EMBODIMENT

Figure 1:
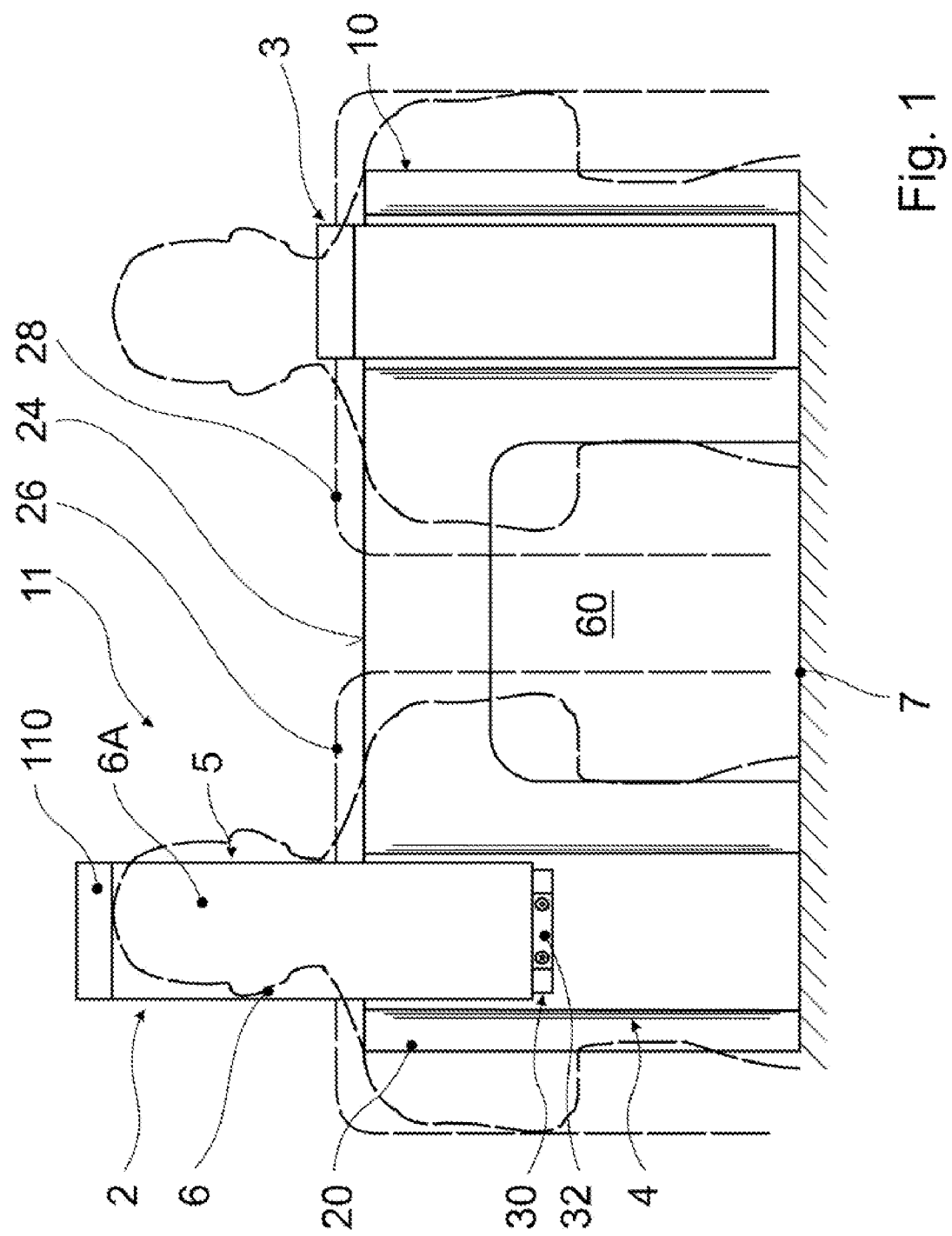
FIG. 1 is a schematic front view of a transverse wall of a convertible vehicle with a rollover-protection system.

FIGS. 1-9 show, in a simplified representation, an area of a transverse wall 10 of a convertible vehicle which has a rollover-protection system 11, which is designed with a rollover-protection device 2 or 3 for arrangement behind a respective vehicle seat 26, 28. The similarly designed rollover-protection devices 2, 3 each have a first module 4 attached to the body and a second module 5, movable between a lowered rest position and an elevated support position with a rollover element 6, in which the second module 5 is guided in a translational movement on the first module 4.

Each rollover-protection device 2, 3 also has a releasable holding device 210 to hold the second module 5 with the rollover element 6 in its rest position, a locking device 500, by means of which the second module 5 can be supported automatically in a position deviating from its rest position against a force acting in the direction of the rest position, and a drive system 50 with a spring-force accumulator 52, by means of which the second module 5 can be held in its rest position and, if necessary, moved in the direction of its support position.

The spring-force accumulator 52 of drive system 50 is designed here as a compression spring, which is supported with its upper end with a first spring retainer 55 on the rollover element 6 and supported with its lower end with a second spring retainer 56 mounted to slide with respect to a spring-guide rod 53 on the first module 5.

In an alternative embodiment, the spring-force accumulator can also be designed as a tension spring that is connected at its upper end to a spring suspension on a spring-guide rod, which is supported on the vehicle floor 7 or on another element attached to the vehicle, and effectively connected at its lower end by a driver to the rollover element, so that the spring, held under tension in the rest state of the rollover-protection system, during activation of the rollover-protection system and release of the rollover element by the holding device, contracts and then drives the rollover element into the deployment direction.

The spring 52 of the corresponding rollover-protection device 2, 3 is arranged in the interior of the transverse wall 10 of the vehicle, designed here with double walls, with a front wall 10A bordering an occupant space and a rear wall 10B facing a storage space on the rear side and spaced from front wall 10A, and passes through the transverse wall 10 of the vehicle at an outlet opening 25, which is designed in an upper, at least roughly horizontal limitation wall 24 of the transverse wall 10 of the vehicle.

The rollover element 6 is designed here as a cassette, in which a front wall 6A of the rollover element 6 is guided on a side 20 of the transverse wall 10 of the vehicle facing the occupant space, and whose front wall 10 and a rear wall 6 of the rollover element 6 are guided on a side 22 of the transverse wall 10 of the vehicle facing away from the occupant space or its rear wall 10B, so that the transverse wall 10 the vehicle forms the first module 5 attached to the vehicle.

Figure 2:
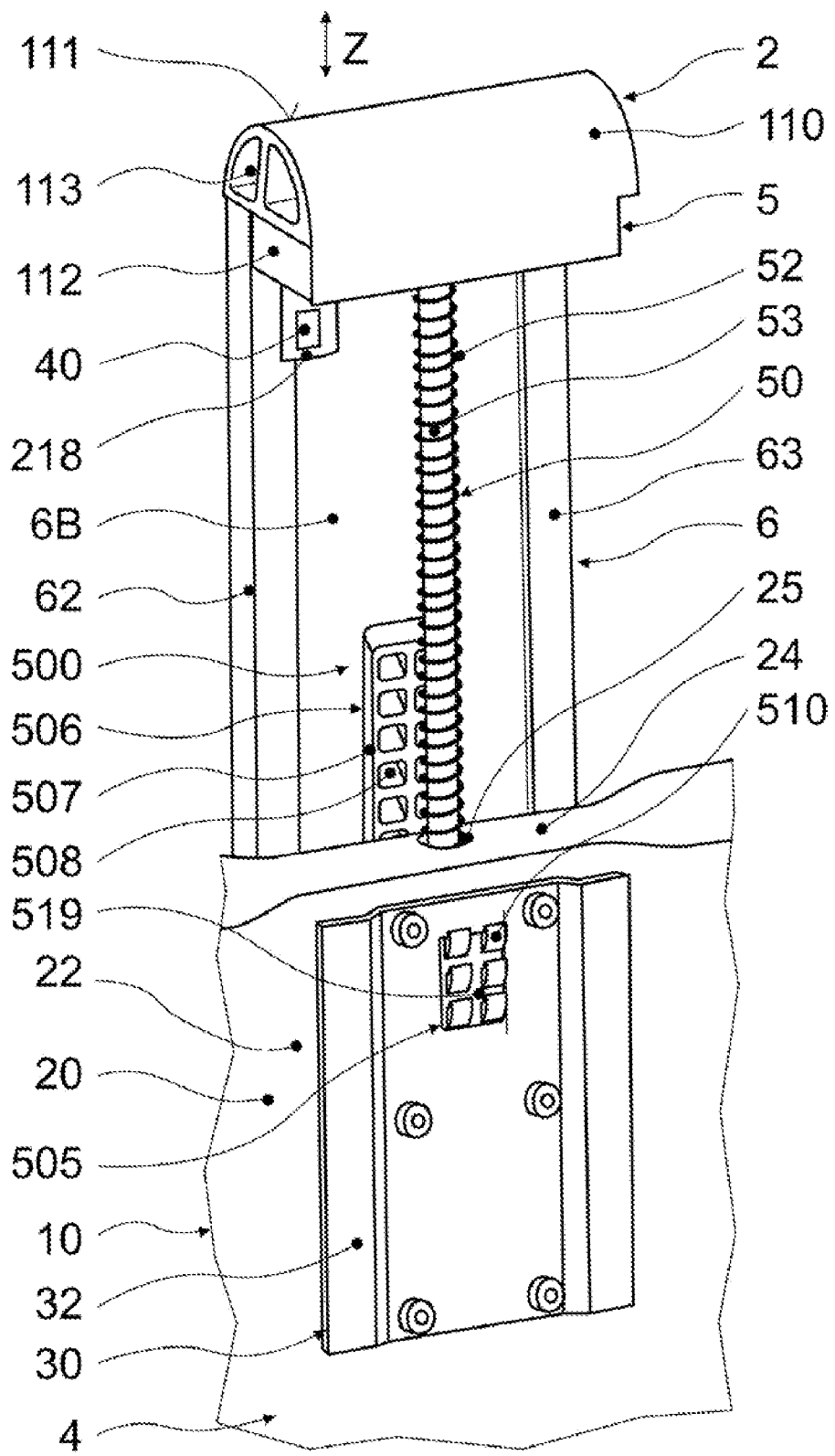
FIG. 2 is a perspective view of a partially exposed rollover-protection device of the rollover-protection system of FIG. 1.
Figure 3:
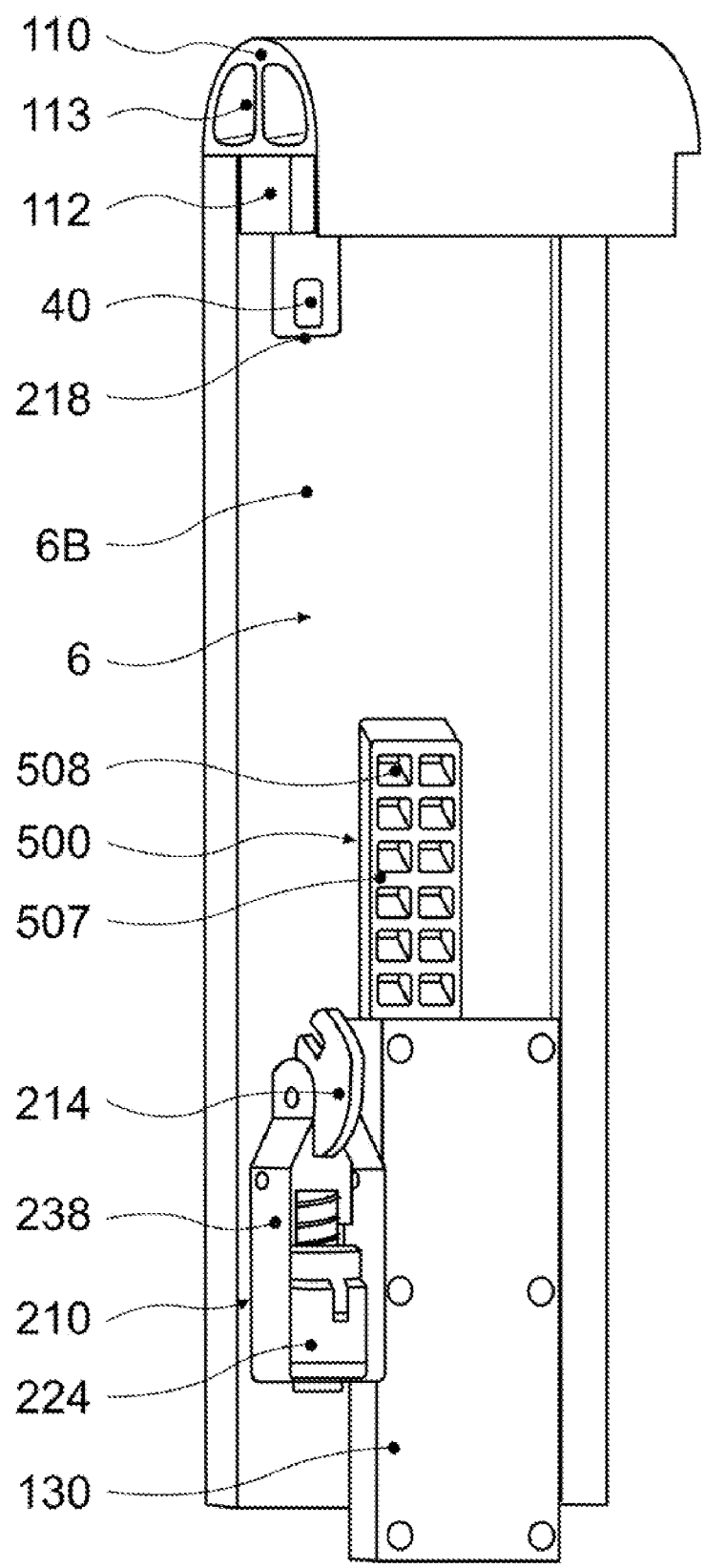
FIG. 3 is a cutout perspective view of an area of the rollover-protection device of FIG. 2 in a single position.
Figure 4:
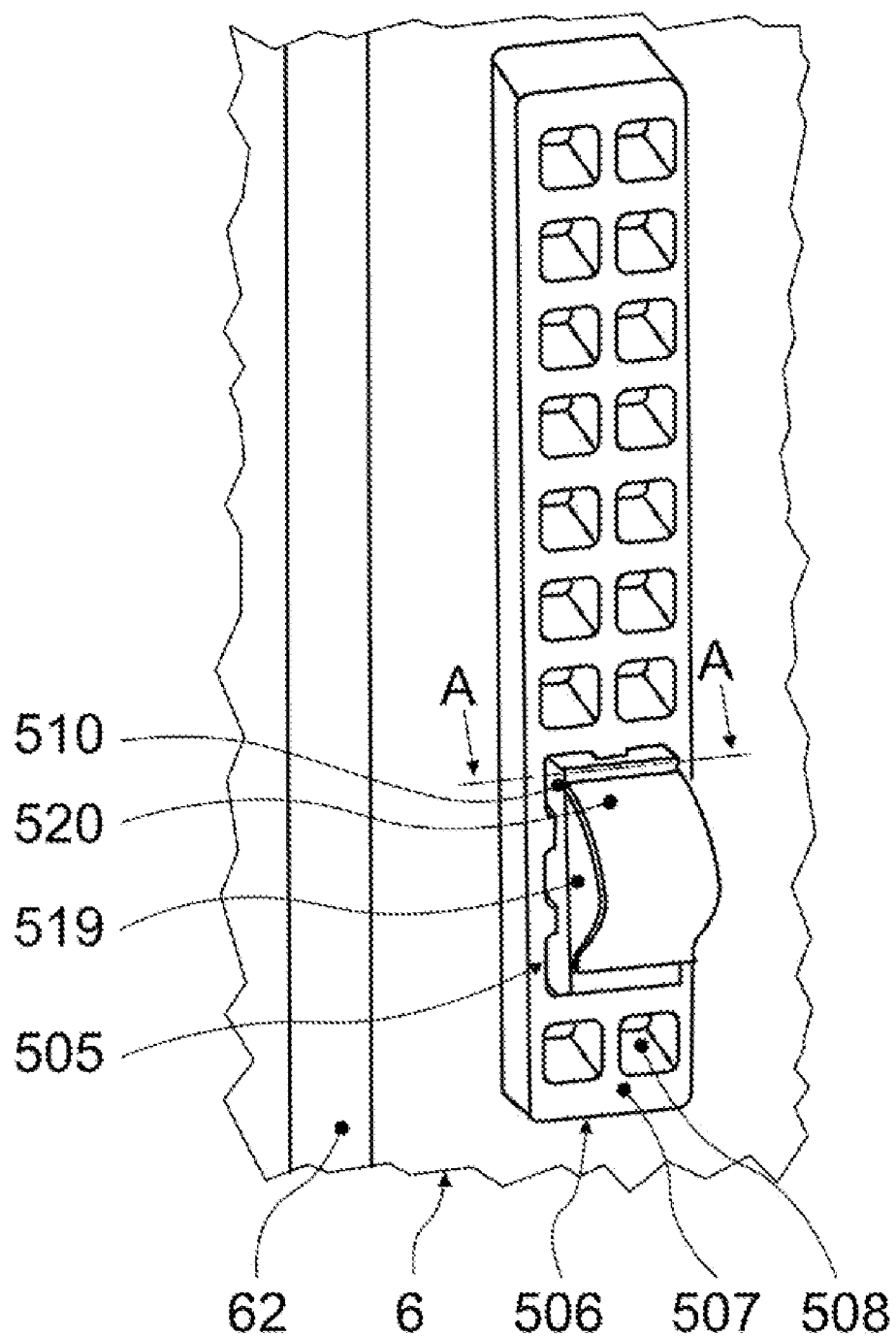
FIG. 4 is partial perspective view of a ratchet device of a locking device of the rollover-protection device of FIG. 3.
Figure 5:
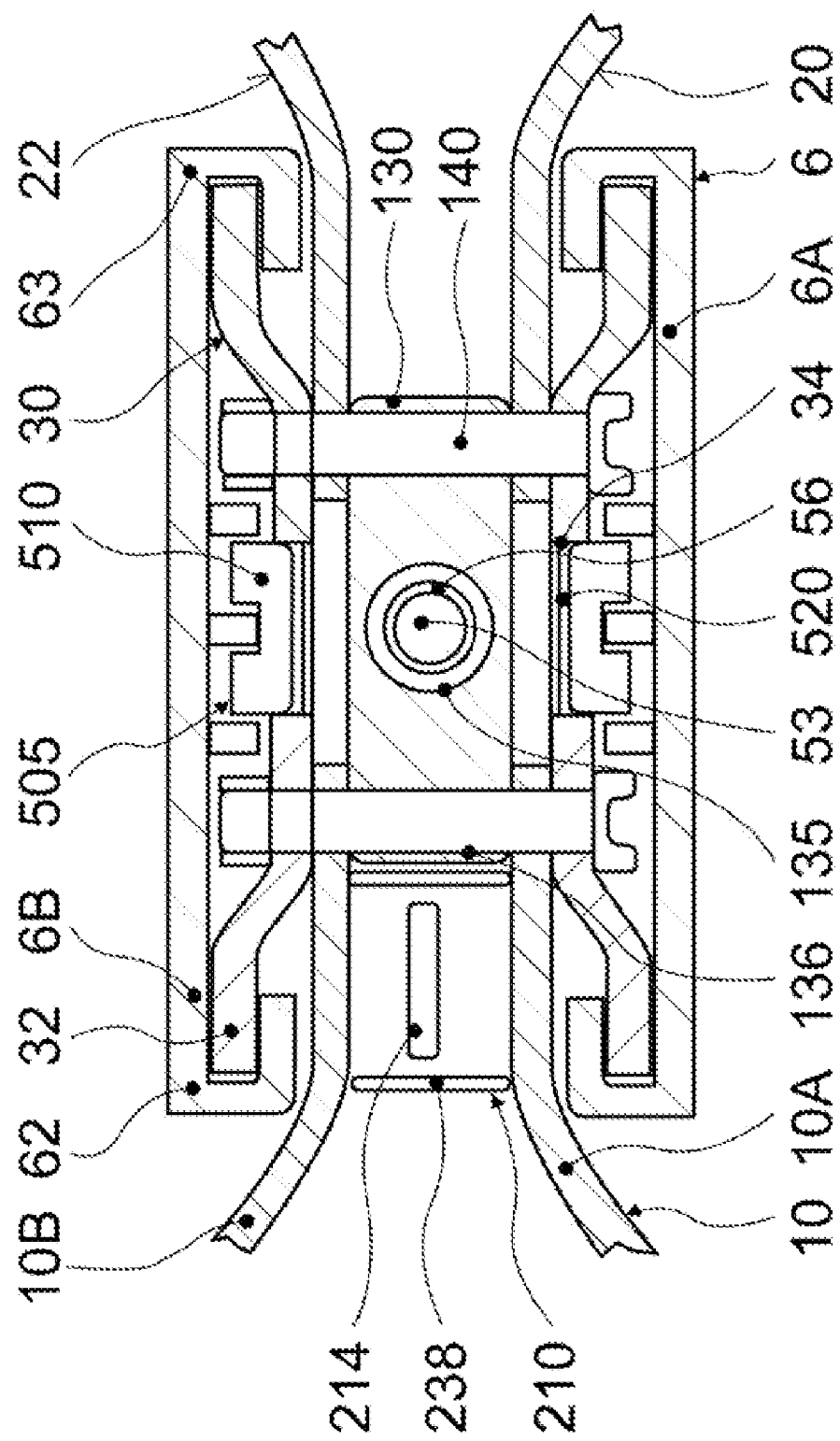
FIG. 5 is a cross sectional view taken along line A-A in FIG. 4.

As can be seen, in particular, from FIGS. 2, 3 and 5, a guide device 30 for the corresponding wall 6A or 6B of the rollover element 6 is arranged on the front wall 10A and the rear wall 10B of the transverse wall 10 of the vehicle, whereby the guide device in the variant shown is designed as a guide plate 30 fastened onto the transverse wall 10 of the vehicle with guide rails 32 on both sides running in the axial direction of the rollover element 6.

The guide rails 32 for the rollover element 6, in its walls 6A, 6B, are designed as bent areas on the guide plate 30, whereby the guide plate 30 is spaced from the transverse wall 10 of the vehicle, so that an undercut is produced, which forms a type of laterally open groove together with the transverse wall 10 of the vehicle.

The walls 6A and 6B of the rollover element 6 are designed corresponding to both side edges with U-shaped areas 62, 63, which are designed to engage guide rails 32.

At the upper end, the front wall 6A and the rear wall 6B of the rollover element 6, which here represent extruded profile plates, are connected to each other by a bridge 112, for example, by a screw connection. Above the bridge 112, that reinforces the rollover element 6 and serves as a spacer, an impact element 110 is arranged as an upper closure of the rollover element 6, which has a semi-cylindrical rounded impact surface 111 on the top and is designed as an extruded profile with cavities 113.

As shown in FIG. 5, the transverse wall 10 of the vehicle, in the area of the rollover-protection devices 2, 3, is tapered by an appropriately curved trend of its front wall 10A and its rear wall 10B over its entire cross-section, so that the corresponding walls 6A and 6B of the rollover element 6 are roughly flush to a surrounding area of the transverse wall 10 of the vehicle.

As can be seen, in particular from FIG. 5, to reinforce the transverse wall 10 of the vehicle, a bridging spacer component 130 is arranged in the area of the rollover-protection devices 2, 3 between the front wall 10A and the rear wall 10B of the transverse wall 10 of the vehicle. This cuboid spacer component 130 is a component of solid material with a central axial hole 135 running parallel to the deployment direction Z of the rollover element 6, in which the spring-force accumulator 52 of the drive system 50, designed here as a compression spring 52, is almost fully accommodated or contained in the rest state of the rollover-protection system 11.

The spring 52 is guided on the spring guide rod 53 between spring retainers 55, 56, but it is also possible, in a simplified embodiment, for the spring-force accumulator 52 to be directly supported on a shoulder of the spacer component 130.

In addition, the spacer component 130 has transverse holes 136 for passage of screws 140 that secure the guide plates 30 to the transverse wall 10 of the vehicle.

The rollover-protection devices 2, 3 are connected, in all the embodiments shown, with an accident-sensor mechanism of the vehicle (not shown), designed in the usual manner, whereby the holding device 210 is driven, by means of which the rollover element 6 is held in the rest position against the force of spring-force accumulator 52.

In the presence of an accident signal, the corresponding holding device 210 releases the rollover element 6, so that the rollover element 6 is moved by the force of the spring-force accumulator 52 into the deployed support position, in which it is secured by the locking device 500.

Figure 7:
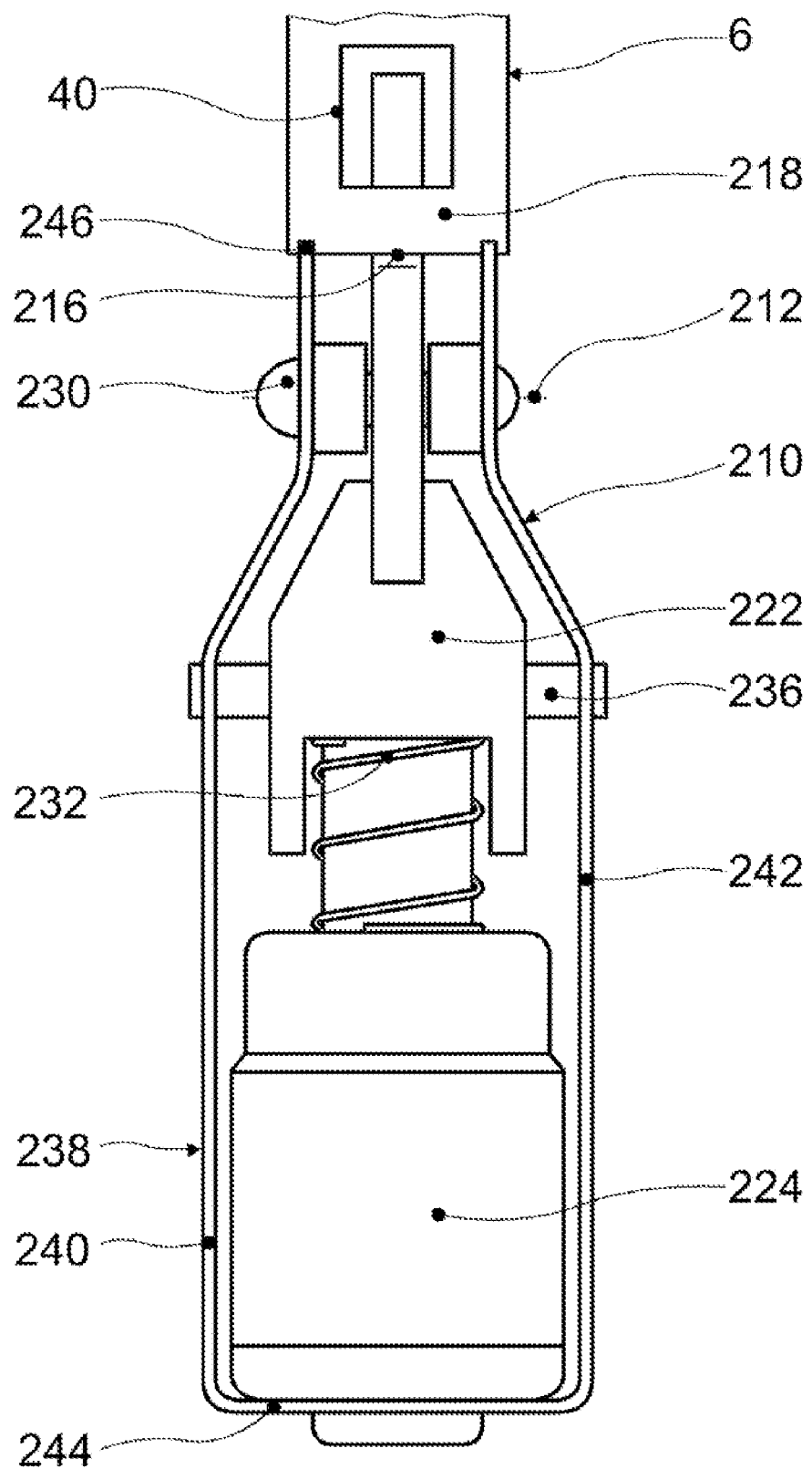
FIG. 7 is a front view of a holding device for a rollover element of the rollover-protection device of FIGS. 1 to 5 in a locked rest state.
Figure 8:
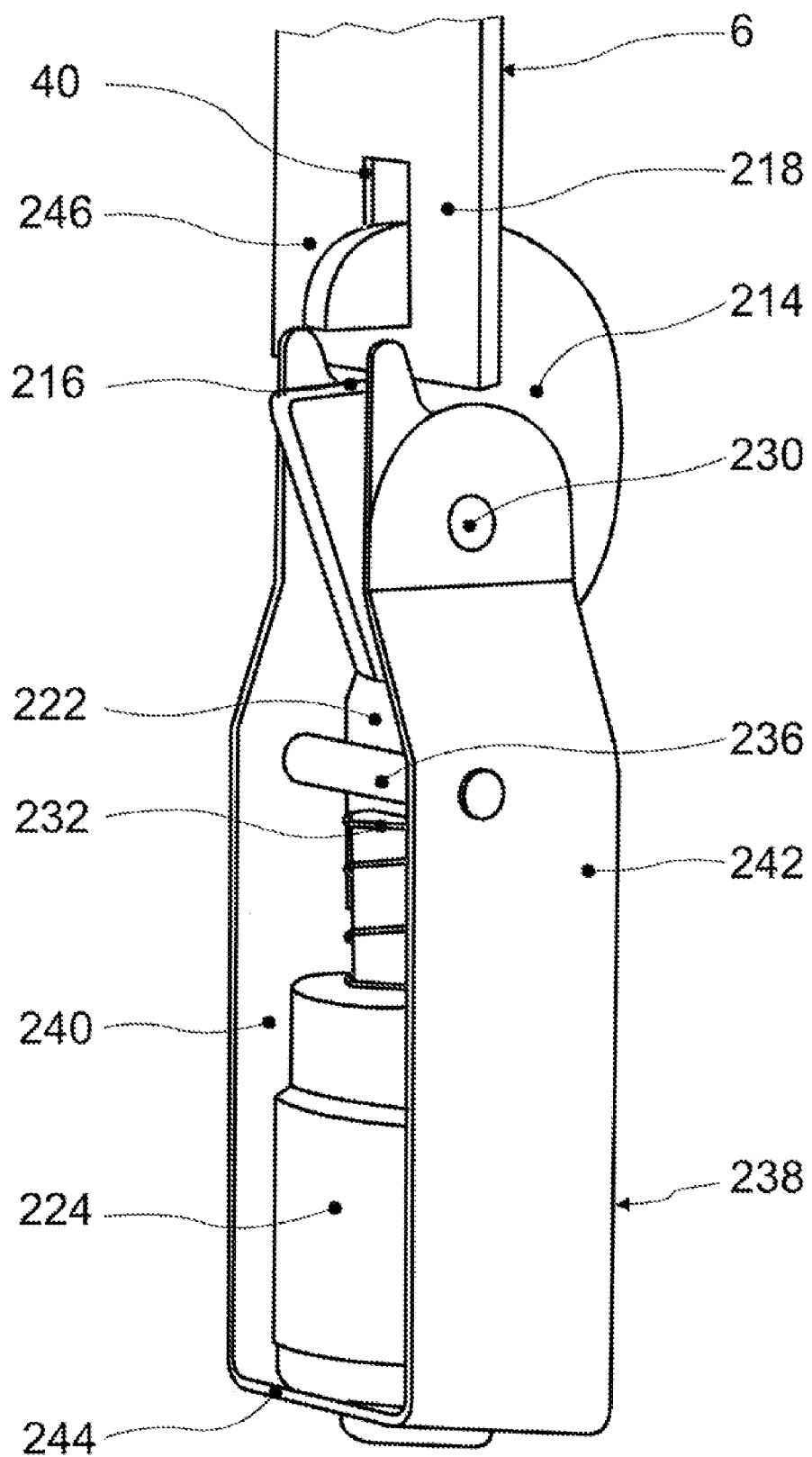
FIG. 8 is the perspective view of the holding device of FIG. 7 in the rest position of the rollover element.
Figure 9:
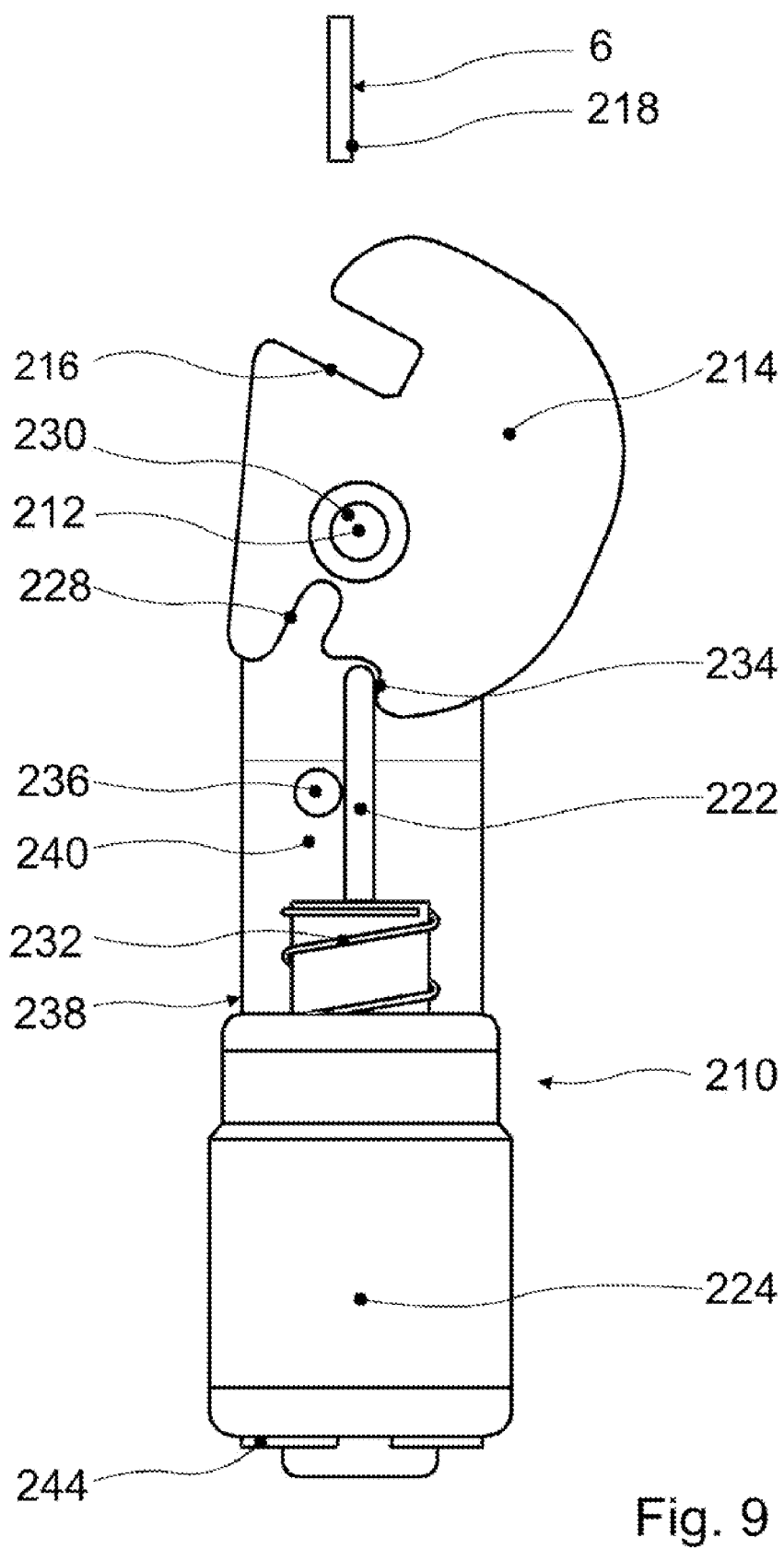
FIG. 9 is a partially cutaway side view of the holding device according to FIG. 7 and FIG. 8 after release and movement of the rollover element into its deployed support position.

FIGS. 7, 8, and 9 show, on an enlarged scale, the holding device 210 used in the present embodiment to hold the rollover element 6.

The holding device 210 includes a locking element 214 mounted to pivot about a fixed axis of rotation 212, which is designed essentially as a disk and has a detent section 216 on its periphery, which is designed as a U-recess in the variant shown and is designed to cooperate with a retaining bracket 218 on the rollover element 6.

The retaining bracket 218 in the embodiment shown is designed simply as a retaining bracket beneath a recess 40 on bridge 112, as shown in FIG. 5.

Dimensioning and shaping of the retaining bracket 218 and the U-recess of the detent section 216 are adjusted to each other, so that the retaining bracket 218, during one rotation of locking element 214 about its axis of rotation 212, can slide without impediments from the detent section 216.

In alternative embodiments, instead of the retaining bracket 218 proposed here, a pin, a shoulder on the rollover element, or an appropriate hook element can be provided as a locking-element counterpart.

In the lowered rest position of rollover element 6, the locking element 214 is secured against the rotation that releases the holding device 210 by a blocking element 222, which cooperates with an actuator 224. The blocking element 222 is designed here as a flat, tongue-shaped plate element attached to a cylindrical piston, axially movable by actuator 224.

In the rest position of the rollover element 6, the blocking element 222 engages a peripheral recess 228 of the disk-shaped locking element 214, so that the recess 228 forms a locking ratchet, which, in the rest position of the rollover element 6, is aligned coaxially to a longitudinal axis of the blocking element 222 and the direction of the action of the actuator 224, which corresponds to the direction of movement of the rollover element 6 and extends in the direction of a pin 230 arranged eccentrically, forming the axis of rotation 212 of locking element 214 essentially at a right angle to the alignment of the U-shaped recess of the detent section 216.

The actuator 224 is driven in an accident situation, recognized by a safety-sensor mechanism of the convertible vehicle, by a corresponding control device, in which the actuator 224, in the event of an accident, experiences a state change that results in translational displacement of the blocking element 222 against the force of a compression spring 232 in the direction of the actuator 224. The blocking element 222 is pulled or moved by this translational movement in the direction of the actuator 224 from the peripheral recess 228 on the disk-shaped locking element 214 to a predetermined point, so that it executes a rotational movement as a result of the tensile force exerted by the retaining bracket 218 of the rollover element 6.

To limit this rotational movement to a predetermined point, a stop 234 is formed on the periphery of the disk-shaped locking element 214, on which the blocking element 222, retracted during release of the holding device from recess 228, comes to a stop after the rotation of the locking element 214 that causes the detent section 216 to disengage from the retaining bracket 218.

In the position shown, pivoting of the locking element 214 about the axis of rotation 212 by about 30° is sufficient to release the holding device 210. Consequently, the peripheral contour of the locking element 214 is radially retracted as far as the stop 234 on the peripheral side in a region of roughly 30° in an area on the peripheral recess 228 opposite the releasing direction of rotation of the locking element 214.

The stop 234, which, after release of the holding device 210, holds the disk-shaped locking element 214 in position in cooperation with blocking element 222, facilitates simple reversal of the rollover-protection system during any incorrect release. Reversal occurs simply by rotation of the locking element 214 in the blocking direction, until the detent section 216 reengages with the retaining bracket 218 of the rollover element 6, in the rest position. In this position, the peripheral recess 228 is flush with the blocking element 222, which locks into the peripheral recess 228 under the pressure of the compression spring 232 and secures the locking element 214 against rotation.

The locking element 214 represents a two-stage disk, in which the arrangement and dimensioning of the recess 228 and stop 234 are chosen according to the arrangement and configuration of the actuator 224 and the blocking element 222.

In an alternative embodiment, it can be envisioned, for example, that the stop for the blocking element 222 is formed on the locking element as a protrusion on the peripheral contour of the locking element, in which case the stop can also be designed as a separate component attached to the locking element. Also deviating from the practical example shown, the prescribed angle of rotation of the locking element between the locked and unlocked position and the configuration of the blocking element, which can also be a pin instead of the flat sheet element shown, can be chosen according to the corresponding application.

As can be further seen from the figures of the drawing, an abutment 236 in the form of a pin is provided at the side of the blocking element 222, which serves to take up the forces that are exerted laterally in the released state of holding device 210 on the side of the locking element 214 and stop 234 on the blocking element 222. By means of the abutment 236, tilting of the blocking element 222 in the released state of holding device 210 can also be prevented in a long design of the blocking element 222.

The abutment 236 is mounted like the pin 230, forming the axis of rotation 212, on a base element 238 of the holding device 210, representing a housing element, in which the base element 238 has opposite sides 240, 242, between which the pin 230 and the abutment 236 are mounted.

In the embodiment shown, the base element 238 is designed essentially as a flat strip with a U-profile, which can be deformed. Here the base element 238 has, on its upper end in the installed state, i.e., on the free end of sides 240, 242, a ramp-like guide 246 for secure guiding of the rollover element 6 and its retaining bracket 218 into the engagement region with the detent section 216 of the locking element 214. A cross-arm 244, which is used here as a seat for the actuator 224, extends between the sides 240, 242 of the base element 238, forming the U-arms of the U-profile. The base element 238 shown therefore forms a type of system cage, which advantageously fulfills the task of a housing, which is often quite demanding to design in known variants, with a significantly simpler configuration.

The actuator 224 in the variant according to FIG. 7, FIG. 8, and FIG. 9 is formed as an electromagnetic actuator of the usual design, but actuators operating according to a different action principle are also suitable, such as piezoelectric actuators, pyrotechnic actuators, or actuators equipped with a meltable insert, for use in the holding device 210.

In its deployed support position that produces a survival space for the vehicle occupants, the rollover element 6 is automatically blocked by the locking device 500, in which the locking device 500 has at least a first ratchet device 505 according to the variants shown in the figures, which can be effectively connected to a second ratchet device 506 to support the second module 5 and permit movement of the rollover element 6 in the direction of its support position.

Figure 6:
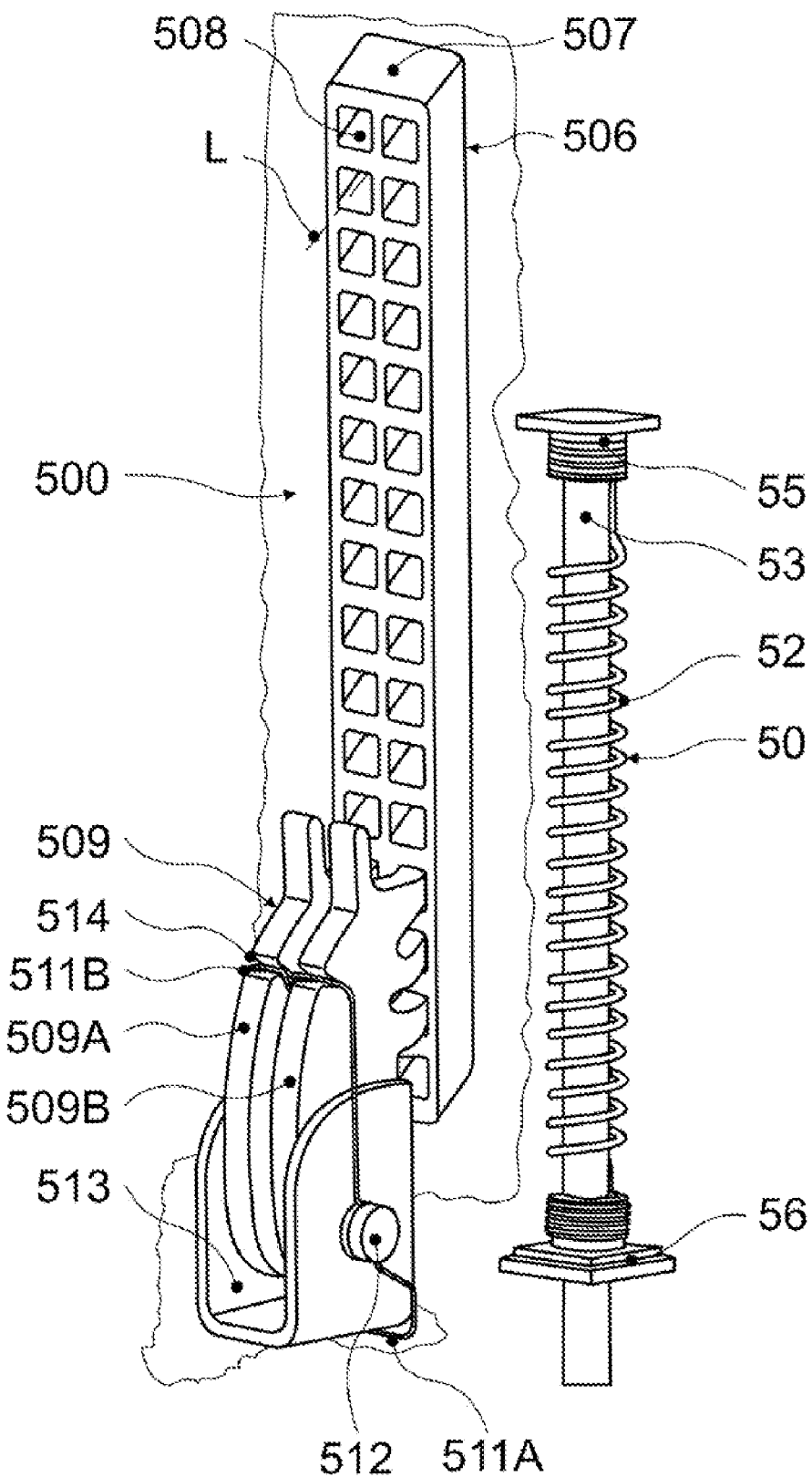
FIG. 6 is a perspective view of an alternate embodiment of the locking device and components of the drive system.

The first ratchet device 505, in both the embodiment according to FIG. 1 to FIG. 5 and in the embodiment according to FIG. 6, has a detent 519 or 509 with locking claws 510, spring-loaded in the direction of its active position, which cooperates with a lock element 507 of the second ratchet device 506, arranged here on the rollover element 6.

In the embodiment according to FIG. 1 to FIG. 5, the detent 519 is a plate-like design with an extruded profile and mounted so as to float in a recess 34 of guide plate 30, i.e., the locking detent 519 is not attached with attaching devices to the surrounding components, but is secured to it in shape-fitting fashion as a floating, sliding piece.

The locking detent 519 is then spring-loaded with the locking claw 510 by a spring device 520, which is represents as a leaf spring, and is mounted to move axially in a translation fashion against the second ratchet device 506. The leaf spring 520, arranged on the side of the locking detent 519 facing away from the locking claw 510, engages a slit of the lock element on the top and is supported on the spacer 130.

The lock element 507 of the second ratchet device 506, designed at least roughly as a strip and produced from an extruded profile, is designed with several honeycomb recesses 508 arranged one behind the other in the movement direction Z of the second module 5, in which the detent 519 or 509 of the first ratchet device 505 engages, depending on the deployment position of rollover element 6, to lock it with several locking claws 510.

The lock element 507 here is produced from an extruded profile with channel-like recesses running in the longitudinal direction of the extruded piece and represents a disk-shaped area with predefined width, which is separated obliquely from the extruded profile by sawing at a predefined cutting angle with respect to a longitudinal axis L of the recesses 508. The width or depth of the lock element 507 can vary, depending on the application, up to a cuboid or cubic geometry of the lock element 507.

The recesses 508 of the lock element 507 are formed here with a rectangular cross-section, it naturally being within the discretion of a professional in the field to make the cross-section of the recesses with any other cross-section shape, such as a circular or oval cross-section.

The embodiment of the locking device according to FIG. 6 differs from the first embodiment by a modified detent 509.

The detent 509 is spring-loaded by a spring device 511 in the direction of the active position, in which the locking claws 510 engage recesses 508, and is mounted with a bearing pin 512 attached to the body on the module 4 attached to the body or the transverse wall 10 of the vehicle, in which case an arrangement similar to the embodiment according to FIG. 1 to FIG. 5, is possible.

The spring device 511 is arranged with a first end area 511A positioned in contact with a component of the first module 4 attached to the body and with an opposite second spring end 511B in a recess 514 of the detent 509.

The bearing pin 512 is arranged on both ends in a U-shaped mounting element 513 and secured or held in position by the spring device 511, designed as a wire spring, which represents a safety for the bearing pin 512. The mounting element 513, representing a type of mounting bar or cage, is firmly attached to the first module 4 and therefore attached on the body side, so that forces acting in the support position of the rollover element 6 through the mounting element 513 can be introduced to the first module 4 and supported, to the desired extent, by the vehicle body.

In the practical example shown in the figures, the detent 509 is designed with two detent disks 509A, 509B arranged parallel to the bearing pin 512 at a distance from each other, each having three locking claws 510 arranged one behind the other in the direction of movement and engaging in the active position of the detent 509 in one of several recesses 508 of the lock element 507, arranged next to each other in a row and beneath each other in rows.

For this purpose, the locking claws 510 of the detent disks 509A and 509B, which are each arranged in a row running perpendicular to the direction of movement of the rollover element 6, are arranged at a distance from each other by at least one interval width between two recesses 508 of lock element 507 of one row, which runs across the movement direction Z of the lock element 507 and corresponds to a row of locking claws 510.

The detent 509 and its detent disks 509A and 509B are also made from an extruded profile that can be produced cost-effectively and, in the practical example shown, are made with the same disk width, in which it can be prescribed in another practical example that the detent disks are designed with a widened bearing sleeve area relative to the remaining disk area. The bearing—sleeve area can then be made by a bearing sleeve arranged in a hole of a detent disk.

The honeycomb recesses 508 of the lock element 507 run from the side of the lock element 507 facing the detent 509 in the direction of the side of the lock element 507 facing away from the detent 509, with respect to the direction of movement Z of the deployable rollover element 6, rising obliquely in the direction of the support position of the rollover element 6 and therefore representing an undercut for the locking claws 510 of the detent 509, so that they snap in securely with the lock element 507 in the support position of the rollover element 6, so that the rollover element 6 is secured with high reliability in a support position that protects the occupants of the vehicle.

The oblique design of the channel-like recesses 508 of the lock element 507 leads to a reduction in the friction forces occurring between the detent 509 and the lock element 507 also during deployment of the rollover element 6 from its rest position in the direction of its support position, in which the locking claws 510, because of the appropriately shaped surfaces, slide on the lock element 507 against the frictional force of spring device 511 without the ratchet devices 505 and 506 locking with each other, so that relative movement between the second module 5 and the first module 4 is not hampered.

In the embodiment shown, the rollover-protection devices 2, 3 of two vehicle seats 26, 28 of a row of seats are arranged roughly in the center relative to vehicle seats 26, 28, but they can also be arranged in the opposite direction, essentially off-center relative to the corresponding vehicle seats, so that a passage opening 60 between the rollover-protection devices 2, 3 can be incorporated into the vehicle interior to enable access to a storage space in the rear of the vehicle and, if required, can be configured larger and adapted in regard to its size and geometry, to the corresponding conditions.

Overall, the group of components described can represent a multifunctional module that can combine the functionalities of a rollover-protection device, a passage opening, a transverse vehicle stiffening, a restraining belt mount and seat attachment, in which the entire multifunctional module can be optionally completed separately in its proposed compact design outside of the vehicle and inserted into a vehicle for final assembly.

In addition to combining the aforementioned functionalities, it is also conceivable that the assembly is part of the convertible top of a convertible vehicle, or that a convertible-top linkage is connected to the assembly having the rollover-protection devices.

The assignment of the individual components described to the practical examples shown is given only as an example, so that any combination of the described components and their assembly is possible.

While the best modes for carrying out the invention have been described in detail, those familiar with the art to which this invention relates will recognize various alternative designs and embodiments for practicing the invention within the scope of the appended claims.

The invention claimed is:

1. A vehicle with a rollover protection system comprising:
   at least one rollover-protection device for at least one vehicle seat mounted with respect to a transverse wall of the vehicle, the rollover protection device including;
   a first module mounted to the vehicle body;
   a second module having a rollover element which is movable between a lowered rest position and an elevated support position; a guide device provided on the first module and operable to allow the second module to translate with respect to the first module;
   a selectively releasable holding device operable to retain the second module in the rest position; a locking device operable to support the second module in a position deviating from the rest position against a force acting in the direction of the rest position;
   a drive system having a spring-force accumulator operable to selectively move the second module in the direction of its support position; and
   wherein the second module includes a cassette-like rollover element, wherein a front wall of the rollover element is guided on a side of the transverse wall of the vehicle facing an occupant space and a rear wall of the rollover element is guided on another side of the transverse wall of the vehicle facing away from the occupant space;
   wherein the transverse wall is disposed between the front wall and the rear wall of the rollover element.

2. The vehicle of claim 1, wherein the transverse wall includes a front wall and a rear wall, wherein the front wall and rear wall are spaced from each other.

3. The vehicle of claim 1, further comprising a guide device having at least one guide rail for the corresponding wall of the rollover element; and wherein the guide device is mounted with respect to the transverse wall of the vehicle.

4. The vehicle of claim 3, wherein the guide device is a guide plate mounted with respect to the transverse wall of the vehicle, wherein the guide rails represent areas biased away from the transverse wall of the vehicle in the installed state.

5. The vehicle of claim 4, wherein the walls of the rollover element include U-shaped areas engageable with the guide rails.

6. The vehicle of claim 1, wherein the transverse wall of the vehicle has a cross-section tapering in the area of the rollover-protection device, so that the corresponding wall of the rollover element is arranged generally flush with a surrounding area of the transverse wall of the vehicle.

7. The vehicle of claim 1, further comprising: an impact element mounted with respect to one end of the rollover element; and wherein the impact element is formed with a rounded impact surface and defines at least one cavity.

8. The vehicle of claim 1, further comprising: a reinforcing bridge disposed between the front wall and rear wall of the rollover element.

9. The vehicle of claim 8, further comprising: a retaining bracket mounted with respect to the reinforcing bridge; and wherein the releasable holding device engages the retaining bracket to retain the second module in the lowered rest position.

10. The vehicle of claim 1, wherein the spring-force accumulator is disposed at least partially within the transverse wall and wherein at least a portion of the spring force accumulator passes through an outlet opening defined by an upper horizontal limitation wall.

11. The vehicle of claim 1, wherein the releasable holding device includes: a locking element pivotably mounted about a fixed axis of rotation, wherein the locking element has a detent section for engagement with a retaining bracket mounted with respect to the rollover element; wherein the detent section of the locking element is sufficiently configured to engage the retaining bracket when the rollover element is in the rest position; and wherein the locking element is secured by a blocking element of an actuator against rotation that releases the holding device when the rollover element is in the rest position.

12. The vehicle of claim 11, wherein the locking element is a disk defining a peripheral recess sufficiently configured to receive the blocking element when the rollover element is in the rest position, and wherein the locking element includes a peripheral stop sufficiently configured to support the blocking element when the rollover element is in the support position.

13. The vehicle of claim 11, wherein the blocking element is movable in an axial direction by the actuator and biased against the locking element by a spring.

14. The vehicle of claim 11, wherein the axis of rotation of the locking element is formed by a pin mounted on opposite sides of a base element, wherein the sides of the base element are connected to each other by a cross arm that forms a seat for the actuator.

15. The vehicle of claim 1, wherein the locking device has a first ratchet device selectively connectable to a second ratchet device to support the second module, wherein the first and second ratchet devices permit movement of the second module from the rest position, in the direction of the support position, wherein a spring-loaded detent is mounted on the first module or the second module and includes at least one locking claw, which cooperates with a lock element of the second ratchet device arranged on the other module.

16. The vehicle of claim 15, wherein the lock element of the second ratchet device is produced from an extruded profile and is generally strip-like in form and defines a plurality of recesses arranged substantially adjacent to each other in the direction of movement of the second module, wherein the detent selectively engages at least one of the plurality of recesses as a function of a deployment position of the second module with the at least one locking claw.

17. The vehicle of the claim 15, wherein the detent is designed as a plate and biased by a spring device against the second ratchet device.

18. The vehicle of claim 15, wherein the detent is mounted to enable rotation of the detent against the second ratchet device.

19. The vehicle of claim 1, wherein a passage opening is at least partially defined by at least one of the rollover-protection devices and the two vehicle seats.

20. The vehicle of claim 1, wherein the rollover-protection devices of two vehicle seats of a row of seats are each arranged in opposite directions, essentially off-center with respect to the corresponding vehicle seat.

21. A vehicle with a rollover protection system comprising: at least one rollover protection device slidably supported on opposing sides of a transverse wall of the vehicle for deployment from a rest position to a support position substantially adjacent to a vehicle seat, wherein the at least one rollover protection device includes a cassette-like rollover element and wherein a front wall of the rollover element is guided on a side of the transverse wall of the vehicle facing an occupant space and a rear wall of the rollover element is guided on another side of the transverse wall of the vehicle facing away from the occupant space;

wherein the transverse wall is disposed between the front wall and the rear wall of the rollover element.

* * * * *